No. 647,358. Patented Apr. 10, 1900.
D. W. BALCH.
LEACHING TANK.
(Application filed Aug. 7, 1899.)
(No Model.)
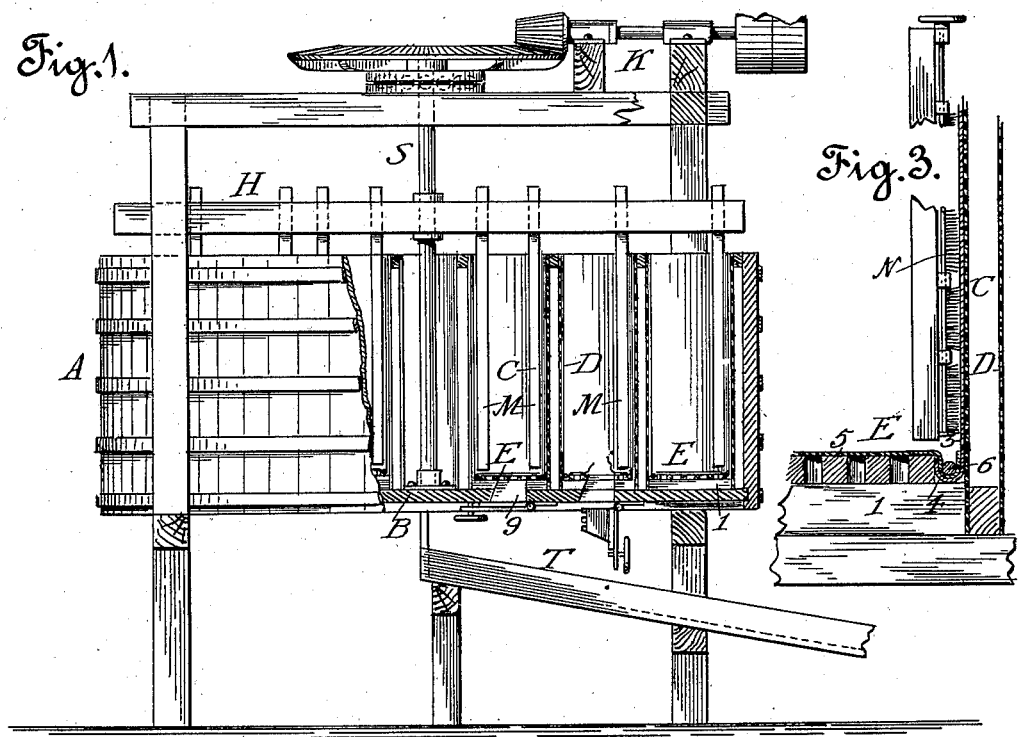
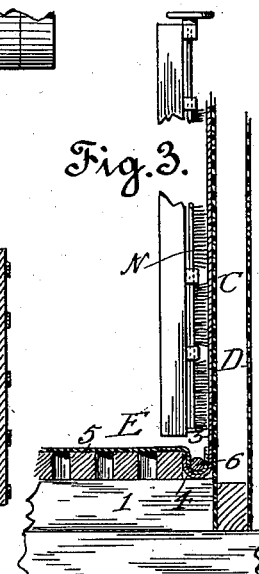
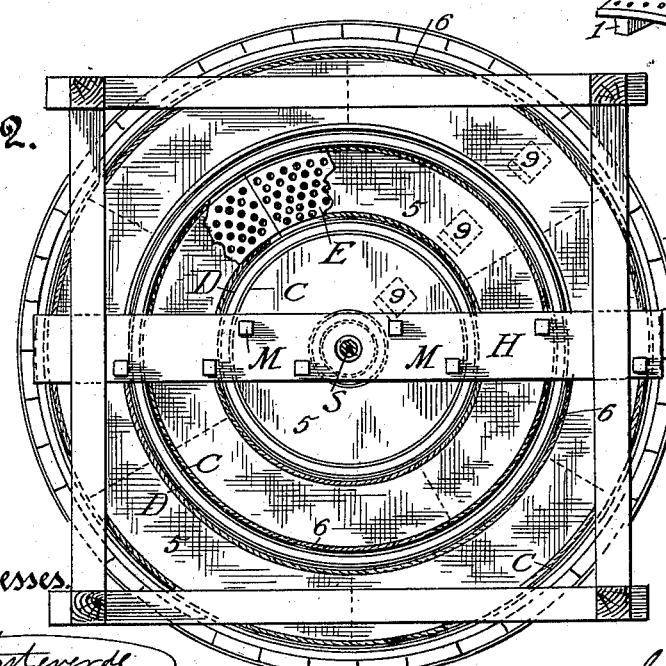
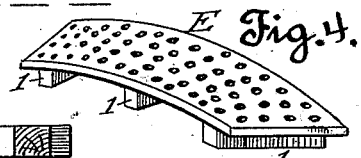
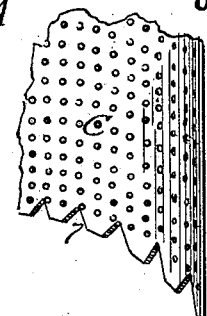
Witnesses
Inventor
D. W. Balch
by Spear & Seely
Attorneys
THE NORRIS PETERS CO., PHOTO-LITHO., WASHINGTON, D. C.

UNITED STATES PATENT OFFICE.

DANIEL W. BALCH, OF SAN FRANCISCO, CALIFORNIA.

LEACHING-TANK.

SPECIFICATION forming part of Letters Patent No. 647,358, dated April 10, 1900.

Application filed August 7, 1899. Serial No. 726,428. (No model.)

*To all whom it may concern:*

Be it known that I, DANIEL W. BALCH, a citizen of the United States, residing at San Francisco, in the county of San Francisco and State of California, have invented certain new and useful Improvements in Leaching-Tanks, of which the following is a specification.

My invention relates to filtering in general, as well as the treatment of ores in solution by leaching or lixiviation; and its principal object is to reduce the time ordinarily required in those processes by affording a very large extent of leaching-surface in the tank or vat in which such processes are carried on. Another result of so increasing the surface is to economize in tank construction. With a comparatively-small tank built according to my invention I can accomplish results which have required several large tanks to produce.

To increase the filtering or leaching area of a tank, I provide it with concentric or parallel interior screens covered with textile material and provide means for the solution which leaches through such interior screens to collect at the bottom. I also arrange such interior screens in pairs, the members of a pair of screens being placed quite closely together, but leaving a space between communicating with a space where the solution is collected.

I have illustrated a practical embodiment of the above and other features of my invention in the accompanying drawings.

My invention is adapted to the filtering of liquids in general and to the leaching of all gold, silver, copper, zinc, and other ores where in the extraction of their metallic and soluble metallic contents and values either water or chemical solutions are used or employed as agents to dissolve and remove their mineral values from the silicious and other valueless matter. It is further adapted to all cyanid leaching-tanks where the gold and silver contents and values are dissolved by cyanid of potassium or other chemical agent. It is also adapted to the lixiviation of silver ores where hyposulfite of soda or any other chemical agent is employed in the removal of the soluble and commercial values contained in the ores so treated. It is also capable of use in the leaching and washing of all gold ores, gold concentrates, and fine slimes where the gold contents are dissolved by chlorin gas or other gas-dissolving methods and where the gold values are removed by leaching with water or chemical solutions. Another of its uses is in the leaching of fine crushed copper, zinc, or other ores where they contain valuable metals that can be put in a soluble form by roasting or else can be treated for their values without roasting by leaching with water or other solvent chemicals in the shape of solutions.

In the drawings, Figure 1 is a side elevation of the apparatus, partly broken away to show a section through the tank. Fig. 2 is a plan view. Fig. 3 is an enlarged detail section of the false bottom and two adjoining screens, showing an arrangement of canvas. Fig. 4 is a detail view of a section of false bottom. Fig. 5 is a detail view of a screen.

A represents a tank which may be constructed of wood or metal and may be circular, rectangular, or other polygonal shape. In the drawings it is shown as circular, for the reason that it is there used with revolving agitators. The tank may be of any size. The one shown in the drawings is supposed to be about seventeen feet in diameter. It is provided with a heavy bottom B and is open at the top. Within this tank are placed concentric or parallel screens C D, arranged in pairs, so that each pair forms a double screen, with a narrow space between extending to the bottom. If the tank is to be used for filtering water, this narrow space can be filled with charcoal or other suitable filtering material, or the filtering members C D can be made of some porous filtering material. The lower edges of all the screens are preferably cut, notched, or recessed, as shown at 7, Fig. 5, to allow free communication between them. The screens can be made of wire-netting or of perforated metal or wood. If the tank is of wood, it, as well as any other exposed wooden part, should be thoroughly painted inside to prevent absorption. The outer screen need not be double, but can form a continuous space in connection with the wall of the tank. Above the main bottom of the tank is a perforated false bottom E, which can be constructed in any convenient way. I have shown pieces of wood 1 upon the main bottom, upon which are laid the sections of false bottom E, which may be of metal or of painted wood. The effect is of a continuous area of false bottom interrupted by the parallel pairs of screens, which extend down to the main bottom, as shown in Fig. 1. The false bottom and the sides of the screens adjacent to the wider spaces between the pairs of screens are covered with canvas or other suitable textile material. I prefer to arrange and secure this canvas in the manner shown in Fig. 3. The canvas 3, which covers the vertical screen, is turned down in the groove 4, formed between the screen and false bottom. The canvas 5, which covers the false bottom, is also turned down into this groove, so that one overlaps the other and makes a joint. A rope 6 is then forced into the groove above the canvas in order to hold the joint firmly and still be removable. Separate lengths of rope can be used or a single length can extend entirely around the circumference or extent of each groove. By the use of a series of canvas-covered screens it is evident that the leaching and filtering surface is greatly multiplied and that the leaching action takes place over a much greater area than in the old tanks having simply a canvas-covered bottom. The solution leaches out through the entire extent of the screens into the spaces between the double screens, down which it descends to the main bottom, from which it is removed. Free communication is afforded over the whole extent of the main bottom by forming the notches or recesses 7 in the lower edges of all the screens.

One or more discharge-openings are provided in the main bottom, which are closed by doors or gates 9, preferably hinged and having a suitable fastening device. I have indicated one of such discharge-openings for each leaching-space and have shown a trough T beneath, into which they discharge. This trough may extend across the entire bottom, and a greater number of discharge-openings can be employed, if desirable. The doors or gates, which when closed form parts of the main bottom surface, are covered with canvas, and the main bottom canvas is slitted to form flaps, which cover the joints around the doors. These flaps can be raised and turned back when the tank is discharging.

The number of pairs of screens used will depend upon the diameter of the tank, and the leaching-spaces should be as narrow as practicable in order to use as many screens as possible and so secure the greatest amount of leaching-surface. As it is necessary to allow a man to enter such space in order to place and remove the canvas, &c., it will be found convenient to place the pairs of screens about thirty inches apart in order to give room for such operations.

My device has thus far been described as a leaching-tank simply; but in many cases it is sometimes desirable to agitate the material in the tank. As a convenient way of accomplishing this a bar or head H is mounted upon a vertical shaft S, shown as stepped centrally in the bottom of the tank. This shaft is geared down, as shown, from a driving-shaft K in order to secure a properly-slow rotation. Upon the head H are arranged a number of agitating-blades M, extending nearly to the false bottom and preferably arranged in proximity to the screen-surface. It will be found advantageous to use two of such blades in one or more of the spaces nearest the center, where the motion is slowest. In connection with these agitating-arms I provide scrapers or brushes N, which are preferably journaled in bearings on each arm, so as to be turned outwardly to bear upon the adjacent canvas when desirable to brush or scrape off the adhering material, which tends to clog and retard the leaching action.

The divisional spaces can be applied to old as well as new tanks by providing them with my arrangement of screens, and such tanks can be of any shape or plan view, such as square, oblong, polygonal, or circular.

I do not limit myself to the details of construction herein shown and described, as I desire to avail myself of such modifications and equivalents as fall properly within the spirit of my invention.

Having thus fully described my invention, what I claim as new, and desire to secure by Letters Patent, is—

1. A tank for the purposes described, having a bottom, a leaching false bottom above the same, and vertical filtering-partitions arranged in pairs within the tank; whereby spaces are left between pairs of partitions, and other spaces are left between members of such pairs, said spaces last named all communicating with the chamber between the bottom and false bottom.

2. A tank for the purposes described, having a bottom, interior screens dividing said tank into compartments, and arranged in pairs with a space between the members of each pair, leaching-coverings for said screens, and false bottoms arranged in the spaces between the adjacent pairs of screens.

3. A tank for the purposes described, having concentric interior screens arranged in pairs and having leaching-coverings, and revolving agitating-arms extending into the spaces between said pairs of screens.

4. A tank for the purposes described, having concentric interior screens arranged in pairs and having leaching-coverings, revolving agitating-arms extending into the spaces between said pairs of screens, and scraping devices carried by and adjustable upon said arms so as to be either active or inactive during the movement of said arms.

5. In a tank for the purposes described, and in combination, the tank-wall, bottom, and perforated false bottom, vertical screens extending through said false bottom, a space between each screen and the adjacent false bottom, a textile covering for the false bottom having its edges turned into said space, a textile covering for each screen having its edge turned into said space, and a rope forced into said space above the textile edges for holding them in place.

In testimony whereof I have affixed my signature, in presence of two witnesses, this 26th day of July, 1899.

DANIEL W. BALCH.

Witnesses:
Q. W. SEELY,
M. R. SEELY.